United States Patent
Sigworth et al.

(10) Patent No.: US 7,635,731 B2
(45) Date of Patent: *Dec. 22, 2009

(54) CELLULOSIC-THERMOPLASTIC COMPOSITE AND METHOD OF MAKING THE SAME

(75) Inventors: William D. Sigworth, Naugatuck, CT (US); Robert G. Rowland, Woodbridge, CT (US); Mark Richardson, Cheshire, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/487,068

(22) Filed: Jul. 14, 2006

(65) Prior Publication Data

US 2007/0027234 A1    Feb. 1, 2007

Related U.S. Application Data

(60) Provisional application No. 60/704,227, filed on Jul. 28, 2005.

(51) Int. Cl.
    B29C 47/00    (2006.01)
    B28B 3/20    (2006.01)
(52) U.S. Cl. ....................................................... 524/13
(58) Field of Classification Search ............... 524/13
    See application file for complete search history.

(56) References Cited

U.S. PATENT DOCUMENTS

| | | | |
|---|---|---|---|
| 3,888,810 A | | 6/1975 | Shinomura |
| 3,915,910 A | * | 10/1975 | Nakano et al. ............... 524/14 |
| 3,943,079 A | * | 3/1976 | Hamed ........................ 524/14 |
| 4,182,696 A | * | 1/1980 | Wynstra et al. .............. 524/14 |
| 4,325,850 A | | 4/1982 | Mueller |
| 4,338,228 A | * | 7/1982 | Inoue et al. ................. 524/120 |
| 4,433,073 A | | 2/1984 | Sano et al. |
| 4,496,718 A | * | 1/1985 | Rudy .......................... 536/56 |
| 4,506,056 A | | 3/1985 | Gaylord |
| 4,567,215 A | * | 1/1986 | Jackson ....................... 523/218 |
| 4,675,122 A | | 6/1987 | Lüers et al. |
| 4,713,186 A | | 12/1987 | Kristen et al. |
| 4,746,688 A | * | 5/1988 | Bistak et al. ................. 523/220 |
| 4,791,020 A | | 12/1988 | Kokta |
| 4,987,173 A | | 1/1991 | Nomura et al. |
| 5,082,605 A | | 1/1992 | Brooks et al. |
| 5,120,776 A | | 6/1992 | Raj et al. |
| 5,187,202 A | * | 2/1993 | Walkowski ................. 524/35 |

(Continued)

OTHER PUBLICATIONS

Effectiveness of Maleated and Acrylic Acid-Functionalized Polyolefin Coupling Agents for HDPE-Wood-Flour Composites, Qingxiu Li, Laurent M. Matuana, Journal of Thermoplastic Composite Materials, vol. 16, Nov. 2003, pp. 551-564.

(Continued)

*Primary Examiner*—Mark Eashoo
*Assistant Examiner*—Liam J Heincer
(74) *Attorney, Agent, or Firm*—Jaimes Sher

(57) ABSTRACT

Provided is a composition comprising fatty acid bis-amide, inorganic particulate such as pumice, cellulosic particulate, thermoplastic and maleic anhydride grafted polyolefin. The combination of an ethylene bis-amide and a minor amount of pumice produces cellulosic-thermoplastic composite that has superior extrusion properties over conventional metal stearate/ethylene bis-stearamide (EBS) compositions such as improved flex strength and resistance to water absorption.

17 Claims, 1 Drawing Sheet

U.S. PATENT DOCUMENTS

| | | | |
|---|---|---|---|
| 5,232,967 A * | 8/1993 | Worschech et al. | 524/310 |
| 5,306,542 A | 4/1994 | Bayer | |
| 5,308,896 A | 5/1994 | Hansen et al. | |
| 5,326,513 A | 7/1994 | Kubbutat | |
| 5,376,701 A | 12/1994 | Chow et al. | |
| 5,416,140 A * | 5/1995 | Columbus et al. | 524/13 |
| 5,441,801 A | 8/1995 | Deaner et al. | |
| 5,516,472 A | 5/1996 | Laver | |
| 5,565,576 A | 10/1996 | Hall et al. | |
| 5,679,145 A | 10/1997 | Andersen et al. | |
| 5,847,042 A | 12/1998 | Hosoda et al. | |
| 5,972,864 A | 10/1999 | Counts | |
| 5,981,461 A | 11/1999 | Counts et al. | |
| 6,013,723 A * | 1/2000 | Akao | 524/577 |
| 6,021,973 A | 2/2000 | Makino et al. | |
| 6,036,761 A * | 3/2000 | Columbus et al. | 106/162.5 |
| 6,066,680 A | 5/2000 | Cope | |
| 6,074,762 A | 6/2000 | Cretekos et al. | |
| 6,114,431 A * | 9/2000 | Lee et al. | 524/435 |
| 6,124,384 A * | 9/2000 | Shiraishi et al. | 524/35 |
| 6,255,268 B1 | 7/2001 | Counts | |
| 6,265,037 B1 | 7/2001 | Godavarti et al. | |
| 6,270,883 B1 | 8/2001 | Sears et al. | |
| 6,329,454 B1 | 12/2001 | Krabbenborg | |
| 6,337,138 B1 | 1/2002 | Zehner et al. | |
| 6,344,504 B1 | 2/2002 | Zehner et al. | |
| 6,498,205 B1 | 12/2002 | Zehner | |
| 6,548,577 B2 * | 4/2003 | Kitayama et al. | 524/35 |
| 6,590,021 B2 | 7/2003 | Mitsuno et al. | |
| 6,620,209 B2 * | 9/2003 | Kischkel et al. | 8/137 |
| 6,632,863 B2 | 10/2003 | Hutchison et al. | |
| 6,680,090 B2 | 1/2004 | Godavarti et al. | |
| 6,682,789 B2 * | 1/2004 | Godavarti et al. | 428/34 |
| 6,743,507 B2 | 6/2004 | Barlow et al. | |
| 6,759,473 B1 * | 7/2004 | Nakamura et al. | 524/503 |
| 6,780,359 B1 * | 8/2004 | Zehner et al. | 264/115 |
| 6,921,789 B2 | 7/2005 | Booth et al. | |
| 7,151,125 B2 * | 12/2006 | Williams et al. | 524/13 |
| 2001/0049406 A1 * | 12/2001 | Cox et al. | 524/27 |
| 2001/0051243 A1 * | 12/2001 | Godavarti et al. | 428/36.9 |
| 2001/0051727 A1 * | 12/2001 | Maligres et al. | 546/193 |
| 2002/0123541 A1 * | 9/2002 | Hughes | 524/13 |
| 2002/0161072 A1 * | 10/2002 | Jacoby et al. | 524/27 |
| 2003/0018105 A1 * | 1/2003 | Baker | 524/35 |
| 2003/0069336 A1 * | 4/2003 | Yasuda et al. | 524/35 |
| 2003/0100634 A1 * | 5/2003 | Heath et al. | 524/35 |
| 2003/0224173 A1 | 12/2003 | Sackinger et al. | |
| 2003/0229160 A1 * | 12/2003 | Williams et al. | 524/13 |
| 2004/0002569 A1 * | 1/2004 | Kitano et al. | 524/494 |
| 2004/0043914 A1 | 3/2004 | Kaziska et al. | |
| 2004/0192794 A1 * | 9/2004 | Patterson et al. | 521/84.1 |
| 2004/0204519 A1 * | 10/2004 | Fender et al. | 524/35 |
| 2005/0080168 A1 * | 4/2005 | Medoff et al. | 524/13 |
| 2005/0165142 A1 * | 7/2005 | Nishimura et al. | 524/210 |
| 2006/0065993 A1 * | 3/2006 | Stucky et al. | 264/51 |
| 2006/0084729 A1 * | 4/2006 | Clarke et al. | 524/35 |
| 2006/0094802 A1 * | 5/2006 | Gibson et al. | 524/35 |
| 2006/0148935 A1 * | 7/2006 | Davidsaver | 524/13 |
| 2007/0036832 A1 * | 2/2007 | Williams et al. | 424/405 |
| 2007/0078050 A1 * | 4/2007 | Fisher et al. | 502/60 |

OTHER PUBLICATIONS

Effects of a New Compatibilizer System on the Flexural Properties of Wood-Polyethylene Composites, Y. Geng, K. Li, J. Simonsen, Journal of Applied Polymer Science, vol. 91, pp. 3667-3672.

Chemical Coupling in Wood Fiber and Polymer Composites: A Review of Coupling Agents and Treatments, John Z. Lu, Qinglin Wu, Harold S. McNabb, Jr., Wood and Fiber Science, 32(1), 2000, pp. 88-104.

Interaction Between Coupling Agent and Lubricants in Wood—Polypropylene Composites, David Harper, Michael Wolcott, Elsevier, Ltd. Part A 35 (2004) pp. 385-394.

* cited by examiner ved
CELLULOSIC-THERMOPLASTIC COMPOSITE AND METHOD OF MAKING THE SAME

CROSS-REFERENCE TO RELATED APPLICATIONS

This application claims priority to U.S. Provisional Application Ser. No. 60/764,227 filed Jul. 28, 2005, which is herein incorporated by reference.

BACKGROUND OF THE INVENTION

1. Field of the Invention

With the increasing scarcity of quality wood lumber, it has become most desirable to seek alternative materials that can substitute for wood. Composite materials prepared from plastics and natural fibers are widely used as such wood substitutes. The use of these composite materials in articles of commerce is increasing rapidly. These composite materials can be used in a variety of products for structural and decorative architectural applications, as well as automotive uses. These composite materials may be cut, shaped, sanded, drilled and fastened in the same manner as natural wood.

Architectural products containing these composite materials prepared from plastics and natural fibers are frequently prepared by extrusion. The architectural products containing these composite materials can be used in both residential and commercial applications. Examples of such applications include decking, railing, fencing, posts, trim, moldings, siding, shingles, lattice, sills, and jambs. When compared to wood, consumers expect such composite materials to offer greater durability and weather resistance, with lower maintenance. Composite materials prepared from plastics and natural fibers are generally resistant to rot and insect attack.

Maximizing the durability of these composite materials prepared from plastics and natural fibers is of critical importance to consumers and producers alike. These composite materials are generally more costly than natural wood. Furthermore, they are also usually heavier than wood, which is a potential hardship to builders, and presents additional structural issues for architects and engineers. In order to overcome these drawbacks, composite materials should offer superior benefits in terms of durability and low maintenance.

Composite materials prepared from plastics and natural fibers may also be used for the production of articles in automotive applications. A variety of parts have been prepared such as knobs, interior door handles, and decorative interior fascia; as well as concealed parts such as sound-deadening panels, trunk liners, tire covers, bins, and carpet backings. Such parts are frequently pressed or molded.

Other uses for composite materials prepared from plastics and natural fibers include sheeting substitutes for fiberboard, particleboard and plywood. Composite materials can be used to make miscellaneous small articles such as planters, tubs, pots, and picture frames.

Useful composite materials can be prepared from various plastics, including polyethylene polypropylene and co-polyethylene-vinyl acetate. Recycled plastics are frequently used in order to lower cost. High-density polyethylene (HDPE) is particularly well-suited for use in decking, railing, fencing, and similar applications.

Natural fibers are used in the composite materials in order to reduce cost and weight of the composite material, and to improve the physical properties, particularly stiffness and tensile strength. Natural fibers are superior to synthetic fibers like carbon and glass as the natural fibers are of lower cost. Natural fibers are preferred over mineral fillers such as talc and mica as the natural fibers produce lighter composites. The natural fibers are usually waste products from other processes. Almost any cellulosic particulate can be used, including wood, newspaper, cardboard, straw, agricultural and plant residues, and the like.

A well-known problem in the formation of composite materials prepared from plastics and natural fibers is the incompatibility of the fiber with the plastic. Natural fibers are hydrophilic, with many free polar hydroxyl groups on the surface. Plastics are hydrophobic. Therefore, the plastics do not readily wet the surface of the natural fiber and adhere thereto. This causes a loss of strength in the resulting composite material.

This problem can be overcome by the addition of coupling agents to the composite material. Coupling agents are thought to function by the reaction of a reactive anhydride or acid moiety with hydroxyl groups on the surface of the fiber to form an ester linkage. The hydrophobic polymer chains extend outwards from the fiber surface, where they can interact with the bulk of the polymer matrix. The exact nature of the interaction will depend upon the choice of coupling agent and polymer, and the extent of crystallinity of the polymer. The coupling agent generally serves as a transitional bridge that improves the adhesion of the plastic to the natural fiber surface. Improved adhesion can result in improved physical properties for the composite material prepared from plastics and natural fibers, particularly the tensile and flexural strength, resistance to water absorption and creep, and reduction in the linear coefficient of thermal expansion (LCTE).

If the composite material prepared from plastics and natural fibers material is to be processed by extrusion, a lubricant is normally added to aid in passage of the composite material from the die. An improperly lubricated system will cause the composite material to extrude at differing rates. This can result in various unacceptable physical defects in the composite material, ranging from a scaly sharkskin appearance to saw-toothed edge tears.

A commonly used lubricant system is a blend of zinc stearate with an N,N'-ethylene bis-stearamide (EBS) wax. Other lubricants include calcium stearate, magnesium stearate, non-metallic stearates; paraffin wax, polyester wax, polypropylene wax, fatty acid derived bis-amides, ethylene bis-oleamide, esters such as stearyl stearate, distearyl phthalate, pentaerythritol adipate stearate, ethylene glycol distearate, pentaerythritol tetrastearate, glycerol tristearate, polyethylene glycol 400 monostearate, glycerol monooleate, glycerol distearate, and blended complex modified fatty acid esters.

Unfortunately, it has been found that the commonly used zinc stearate-EBS lubricant system interferes with the coupling agent. It has been suggested that the zinc stearate is responsible for the interference with the maleic anhydride grafted olefin coupling agents. The stearate ring opens and esterifies the anhydride group, while the zinc complexes the resulting carboxylate. The coupling agent then provides significantly less improvement to the physical properties of the composite material prepared from plastics and natural fibers than expected.

Some commercial composite materials prepared from plastics and natural fibers use a zinc stearate/ethylene bis-stearamide lubricant system without any coupling agent. These formulations extrude quite readily, and provide product of excellent appearance. The physical properties of these composites are deficient when compared to those of natural wood.

2. Description of Related Art

U.S. Pat. No. 6,632,863 claims a two-step process whereby wood-plastic composite (WPC) pellets are made which may contain from 0 to 35% of an additive selected from a group of inorganic fillers and lubricants. The lubricants are subsequently selected from the group of zinc stearate and ethylene bis-stearamide. The inorganic fillers are subsequently selected from the group of talc and mica. The WPC pellet is subsequently re-extruded with additional plastic and additives.

U.S. Pat. Nos. 6,498,205 and 6,344,504 claim a WPC prepared from a powder blend of wood fiber/flour, plastic, and a lubricant selected from zinc stearate and a wax. The specifications give ethylene bis-stearamide as an example of a wax.

U.S. Pat. Nos. 6,682,789 and 6,265,037 and U.S. patent application Ser. No. 2001/0051243 teach a polymer/fiber composite composition, a process for WPC manufacture, and disclose an extruded profile thereby prepared, based on polyolefins prepared by modern metallocene catalysis with a distribution ratio ($M_w/M_n$) of 3 to 6, a melt index of less than 2 gm/10 min, where moisture content is less than 5000 parts per million (ppm) of the formulation, and the fiber dimensions are from 100 to 2000 micrometers (μm), with an aspect ratio of 1:2 to about 1:5. Maleic anhydride grafted olefin coupling agents are used, and the composition may contain lubricants and inorganic fillers.

U.S. patent application Ser. No. 2003/0229160 teaches that ethylene bis-amides made from carboxylic acids of 6 to 10 carbons are superior lubricants to EBS/zinc stearate blends presently used in wood. This application further teaches a composite comprising about 30 to about 70 weight percent polymer, about 70 to about 30 weight percent agricultural waste fiber, and about 1 to 7 weight percent of a lubricant consisting of an amide, an alkylene bisamide, or a combination thereof.

U.S. Pat. No. 4,791,020 teaches the use of up to 40% inorganic filler in a WPC, where the filler is selected from the group consisting of mica, talc, calcium carbonate, silica, glass fiber, asbestos and wollastonite.

U.S. Pat. No. 5,326,513 teaches a process for producing plastic fiber boards using a material selected from balls of expanded glass, expanded clay, pumice granules and mica, admixed with a foaming and hardenable organic and inorganic binder, where the organic binder is an epoxy resin or a polyurethane phenol resin.

U.S. Pat. No. 5,516,472 describes a process ("Strandex Process") widely licensed and used in the WPC industry. The patent teaches that the preferred formulation to be used with the above process includes 3.0 parts zinc stearate and 2.0 parts external (paraffin-type) wax per hundred parts wood flour.

BRIEF SUMMARY OF THE INVENTION

The prior art implies that the removal of metal stearates from composite formulation would be desirable. The prior art does not teach that this can be accomplished while retaining the familiar, inexpensive, and widely used ethylene bis-stearamide in the formulation.

This invention relates to a composition that aids in the processing and manufacture of cellulosic-thermoplastic composite. This composition is an unexpected and synergistic combination of fatty acid bis-amide (a) of the structure:

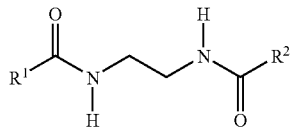

where $R^1$ and $R^2$ are independently saturated or unsaturated linear hydrocarbyl groups containing from about 11 to about 35 carbon atoms, inorganic particulate (b), cellulosic particulate (c), thermoplastic (d) and coupling agent (e) for coupling cellulosic particulate (c) to the thermoplastic (d).

This invention also relates to a method of extruding the combination of fatty acid bis-amide (a), inorganic particulate (b), cellulosic particulate (c), thermoplastic (d) and coupling agent (e) through an extruder to provide cellulosic-thermoplastic composite.

BRIEF DESCRIPTION OF THE DRAWINGS

The invention will be described in conjunction with the accompanying drawings, in which.

DETAILED DESCRIPTION OF THE INVENTION

Figure 1:
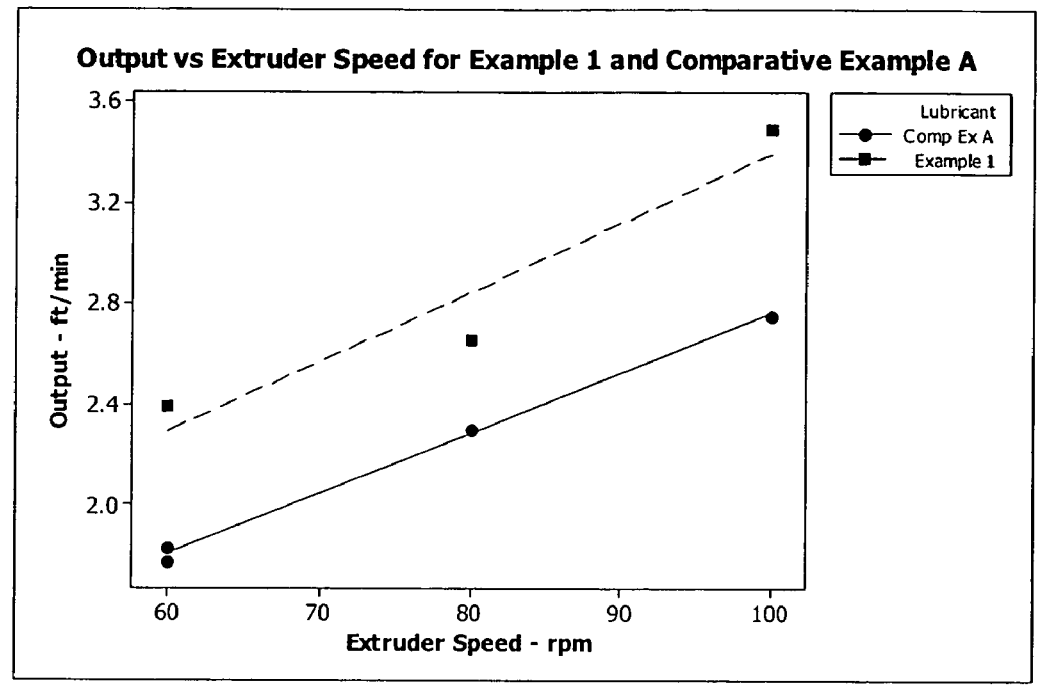
FIG. 1 is a graph of the output vs extruder speed for example 1 and comparative example A.

It is most desirable to be able to use coupling agent in formulation of cellulosic-thenmoplastic composites. Coupling agent can provide significant improvements in the physical properties of cellulosic-thenmoplastic composites. Although, increased difficulty is encountered in extruding cellulosic-thermoplastic composites containing coupling agent, which requires the use of additional lubricant. Additional lubricant can significantly reduce the expected improvements in physical properties.

We have unexpectedly found that the use of coupling agent (e) in combination with fatty acid bis-amide (a) and minor amount of finely powdered pumice overcomes these processing issues, permitting a cellulosic-thermoplastic composite of fully satisfactory appearance to be extruded at a rate comparable to that obtained with a comparative formulation containing zinc stearate/ethylene bis-stearamide and no coupling agent.

Fatty acid bis-amide (a) acts as a lubricant that does not impair functioning of coupling agent (e) that is present. Fatty acid bis-amide (a) structure, as described above, where $R^1$ and $R^2$ can be independently saturated or unsaturated linear hydrocarbyl groups containing from 11 to 35 carbon atoms. Preferably $R^1$ and $R^2$ are independently saturated or unsaturated linear hydrocarbyl groups containing from 15 to 22 carbon atoms. Some examples of fatty acid bis-amide (a) can be N,N'-ethylene bis-stearamide (N,N'-ethylene bis-octadecanamide), N,N'-ethylene bis-oleamide (N,N'-ethylene bis-cis-9-octadecenamide), N,N'-ethylene bis-dodecanamide, N,N'-ethylene bis-tetradecanamide, N,N'-ethylene bis-hexadecanamide, N,N'-ethylene bis-heptadecanamide, N,N'-ethylene bis-tallowamide, N,N'-ethylene bis-eicosanamide, N,N'-ethylene bis-docosanamide, N,N'-ethylene bis-tetracosanamide, N,N'-ethylene bis-4-dodecenamide, N,N'-ethylene bis-9-dodecenamide, N,N'-ethylene bis-4-tetradecenamide, N,N'-ethylene bis-5-tetradecenamide, N,N'-ethylene bis-cis-6-octadeceneamide, N,N'-ethylene bis-trans-6-octadeceneamide, N,N'-ethylene bis-cis -9-octadeceneamide, N,N'-ethylene bis-trans-9-octadeceneamide, N,N'-ethylene bis-trans -11-octadeceneamide, N,N'-ethylene bis-cis-9-eicosenamide, N,N'-ethylene bis-cis-11-eicosenamide, N,N'-ethylene bis-trans-11-eicosenamide, N,N'-ethylene bis-cis-11-docosenamide, N,N'-ethylene bis-cis-13-docosenamide, N,N'-ethylene bis-trans-13-docosenamide, N,N'-ethylene bis-cis-15-tetracosenamide and combinations thereof It will also be recognized by one skilled in the art that the various mixed cross reaction products of N,N'-ethylenediamine with two or more of the parent fatty acid used to prepare the preceeding bis amide may also be used e.g. N-oleyl-N'-stearyl- ethylene-bis-amide. A person skilled in the art will understand that such a cross reaction product can be prepared by reacting N,N'-ethylenediamine with a naturally occurring mixture of fatty acids, such as the acids derived from tallow. A person skilled in the art will understand that a single fatty acid bis-amide (a) can be used or two or more of such fatty acid bis amide (a) can be used.

Inorganic particulate (b) can be any inorganic particulate that can impart lubrication to the composition. The lubrication is such that it can facilitate the extrusion of cellulosic-thermoplastic composite at an equivalent rate compared to conventional zinc stearate/EBS lubricant compositions that are not used with coupling agent (e). Examples of suitable inorganic particulate (b) can be pumice, volcanic ash, alumina, diatomaceous earth, glass, silica, titanium oxide, iron oxide, zinc oxide, magnesium oxide, ceramic materials, calcium silicate hydrates, microspheres, perlite, shirua basalt, zeolites, clay, kaolin, metakaolin, mica, calcium carbonate, wollastonite, talc, titanium dioxide, barium sulfate, calcium sulfate, acrylics, vermiculite, fly ash, microspheres, gypsum, calcium aluminate, xonotlite, magnesia and combinations thereof. Preferred inorganic particulate (b) can be pumice. Most preferred inorganic particulate (b) can be finely powdered pumice, for example, those produced by VitroCo (Vitrolite®), Elkem (Sidistar®), Hess and combinations thereof. A person skilled in the art will understand that a single inorganic particulate (b) can be used or two or more of such inorganic particulate (b) can be used. Inorganic particulate (b) can generally be of a particle size of 50 µm or less, preferably 35 µm or less and more preferably 20 µm or less.

Cellulosic particulate (c) can be any known, conventional, or commercially used cellulosic particulate that can be used in cellulosic-thermoplastic composites. Examples of suitable cellulosic particulate (c) can be wood fiber, wood particles, wood chips, ground wood, wood flour, wood flakes, wood veneers, wood laminates, saw dust, paper, newspaper, cardboard, wood pulp fiber, chemical pulp, recycled paper fiber, recycled boxes, recycled box fiber, recycled newspaper, recycled newspaper fiber, recycled computer printout, recycled computer printout fiber, milling tailings, hardwood fiber, softwood fiber, newsprint, ground newsprint, magazines, ground magazines, books, ground books, ground cardboard, wheat chaff, bamboo fiber, pond sludge, cork and combinations thereof. Preferably, cellulosic particulate (c) is selected from the group consisting of wood fiber, wood flour and combinations thereof. It will be understood by a person skilled in the art that wood pulp can be any known wood pulp material, for example, thermo mechanical wood pulp, chemical thenno mechanical wood pulp and combinations thereof. A person skilled in the art will understand that a single cellulosic particulate (c) can be used or two or more of such cellulosic particulate (c) can be used. Cellulosic particulate (c) can generally be from about 3 mm to about 100 µm in length and from about 1 mm to about 100 µin width. Preferably cellulosic particulate (c) can be from about 1 mm to about 400 µm in length and from about 500 µm to about 100 µm in width. More preferably, cellulosic particulate (c) can be from about 800 µm to about 200 µm in length and from about 400 µm to about 100 µm width. Cellulosic particulate (c) can generally have an aspect ratio of from about 20:1 to about 1:1. Preferably, cellulosic particulate (c) can have an aspect ratio of from about 10:1 to about 1:1. More preferably, cellulosic particulate (c) can have an aspect ratio of from about 5:1 to about 2:1.

Thermoplastic (d) can be any polymer, and preferably is polyolefin and more preferably can be polyethylene, polypropylene, copolymers of ethylene and propylene, copolymers of polyethylene and vinyl acetate and combinations thereof. More preferably, thermoplastic (d) is selected from the group consisting of high-density polyethylene, low-density polyethylene, linear low-density polyethylene, polypropylene, copolymers of ethylene and propylene, co-polyethylene-vinyl acetate and combinations thereof.

As noted above, it is most desirable to be able to use coupling agent (e) in formulation of natural fiber-plastic composites. Coupling agent can provide significant improvements in physical properties of cellulosic-thermoplastic composites. Improvements are most noticeable in the flex strength and resistance to water absorption of cellulosic-thermoplastic composites.

Improved flex strength is important, as natural wood has much higher flex strength than the polymer matrix, and cellulosic-thermoplastic composites must have strength properties that are similar to natural wood if they are to be used in architectural applications. Improved water resistance correlates with resistance to rot, and so is also of utmost importance for products intended for exterior applications. Reductions in creep and LCTE improve the dimensional stability of cellulosic-thermoplastic composite, and therefore its suitability for architectural uses.

These improvements in physical properties are readily observed in molded test specimens. Increased difficulty is encountered in extruding cellulosic-thermoplastic composite containing coupling agent. This requires the use of additional lubricant, which as noted above, can significantly reduce expected improvements in physical properties.

We have unexpectedly found that the use of coupling agent (e) in combination with fatty acid bis-amide (a) and a minor amount of finely powdered pumice overcomes these processing issues, permitting cellulosic-thermoplastic composite of fully satisfactory appearance to be extruded at a rate comparable to that obtained with a comparative formulation containing zinc stearate/ethylene bis-stearamide and no coupling agent. The flex strength and resistance to water absorption of cellulosic-thermoplastic composite of this invention are significantly better than the comparative formulation.

Coupling agent (e) can be maleic anhydride grafted polyolefin, acrylic acid grafted polyolefin, vinyl acetate grafted polyolefin and combinations thereof. Preferably coupling agent (e) can be maleic anhydride grafted high-density polyethylene, maleic anhydride grafted low-density polyethylene, maleic anhydride grafted polypropylene, acrylic acid grafted high-density polyethylene, acrylic acid grafted low-density polyethylene, acrylic acid grafted polypropylene, co-polyethylene-vinyl acetate and combinations thereof.

Coupling agent (e) most preferably is selected from the group consisting of maleic anhydride grafted ("maleated") high-density polyethylene (Polybond® 3009, Polbond® 3029, Polybond® 3039), maleic anhydride grafted linear low-density polyethylene (Polybond® 3109), maleic anhydride grafted polypropylene (Polybond® 3000, Polybond® 3200), acrlic acid grafted high-density polyethylene (Polybond® 1009), acrylic acid grafted polypropylene (Polybond® 1001, Polybond® 1002) and combinations thereof; all available from Chemtura Corporation.

The composition can also contain at least one additional component. Examples of a suitable additional component can be antioxidant, UV stabilizer, foaming agent, dye, pigment, cross-linking agent, inhibitor, and accelerator. In addition further inorganic particulate may be used as filler. Any further inorganic filler may be used provided it does not interfere with extrusion.

Antioxidants are added to prevent degradation of polymer during processing. An example is Chemtura Corporation's Naugard B25 (a mixture of tris (2,4-di-tert-butyl phenyl) phosphite and tetrakis methylene (3,5-Di-tert-butyl-4-hydroxyhydrocinnamate) methane). Foaming agent is added to decrease density of the cellulosic-thermoplastic composite by foaming. Examples of foaming agents are Chemtura Corporation's Celogen® TSH (toluene sulfonyl hydrazide), Celogen AZ (azodicarbonamide), Celogen OT (p-p'-oxybis(benzenesulfonylhydrazide)), Celogen RA (p-toluene sulfonyl semicarbazide), Opex® 80 (dinitrosopentamethyleetetramine), and Expandex® 5-PT (5-phenyltetrazole).

Colorants are pigments or dyes. Dyes are commonly an organic compound soluble in plastic forming a neutral molecular solution. They produce bright intense colors and are transparent. Pigments are generally insoluble in plastic. The color results from the dispersion of fine particles (in the range of about 0.01 to about 1 μm) throughout thermoplastic (d). They produce opacity or at least some translucence in cellulosic-thermoplastic composite. Pigments can be organic or inorganic compounds and are viable in a variety of forms including dry powders, color concentrates, liquids and pre-color resin pellets. Most common inorganic pigments include oxides, sulfides, chromates, and other complexes based on a heavy metal such as cadmium, zinc, titanium, lead, molybdenum, iron, combinations thereof, and others. Ultramarines are typically sulfide-silicate complexes containing sodium and aluminum. Often pigments comprise mixtures of two, three or more oxides of iron, barium, titanium, antimony, nickel, chromium, lead, and others in known ratios. Titanium dioxide is a widely used and known bright white thermally stable inorganic pigment. Organic pigments are also known including azo or diazo pigments, pyrazolone pigments, and others including permanent red 2B, nickel azo yellow, litho red, and pigment scarlet.

Cross-linking agent can optionally be added to strengthen the bond between cellulosic particulate (c), as described above, into a final homogenous product. Cross-linking agent bonds across the pendent hydroxyl groups on the cellulose molecular chain. Cross-linking agent must have the characteristics of forming a strong bond at relatively low temperatures. Examples of cross-linking agent that can be used include polyurethanes such as isocyanate, phenolic resin, unsaturated polyester and epoxy resin and combinations thereof. Phenolic resin may be any single stage or two-stage resin preferably with low hexane content.

Inhibitor is added to retard the speed of the cross-linking reaction. Examples of known inhibitors include organic acids such as citric acid.

Accelerator is added to increase the speed of the cross-linking reaction. Examples of accelerators include amine catalysts such as Dabco® BDO (Air Products), and DEH40® (Dow Chemical).

The amounts of the various components of the composition can be adjusted by those skilled in the art depending on the specific materials being used and the intended use of the material. In one embodiment, the present invention is directed to a composition comprising fatty acid bis-amide (a) present in an amount of from about 1 to about 8 weight percent, inorganic particulate (b) present in an amount of from about 0.25 to about 1.5 weight percent, cellulosic particulate (c) present in an amount of from about 10 to about 90 weight percent, thermoplastic (d) present in an amount of from about 90 to about 10 weight percent, coupling agent (e) present in an amount of from about 0.2 to about 10 weight percent.

In another embodiment, the present invention is directed to a composition comprising fatty acid bis-amide (a) present in an amount of from about 1 to about 8 weight percent, inorganic particulate (b) present in an amount of from about 0.25 to about 1.5 weight percent, cellulosic particulate (c) present in an amount of from about 20 to about 80 weight percent, thermoplastic (d) present in an amount of from about 80 to about 20 weight percent, coupling agent (e) selected from the group consisting of maleic anhydride grafted polyolefin coupling agent present in an amount of from about 0.5 to about 5 weight percent, and acrylic acid grafted polyolefin coupling agent present in an amount of from about 1 to about 7 weight percent, and combinations thereof.

In yet another embodiment, the present invention is directed to a composition comprising fatty acid bis-amide (a) present in an amount of from about 2 to about 6 weight percent, inorganic particulate (b) present in an amount of from about 0.25 to about 1.0 weight percent, cellulosic particulate (c) present in an amount of from about 40 to about 70 weight percent, thermoplastic (d) present in an amount of from about 50 to about 30 weight percent, and coupling agent (e) which is maleic anhydride grafted high-density polyethylene coupling agent present in an amount of from about 1.0 to about 3 weight percent.

In yet still another embodiment the present invention is directed to a composition comprising fatty acid bis-amide (a) selected from the group consisting of N,N'-ethylene bis-stearamide, N,N'-ethylene bis-oleamide and combinations thereof present in an amount of from about 1 to about 8 weight percent; inorganic particulate (b) which is finely powdered pumice present in an amount of from about 0.25 to about 1.5 weight percent; cellulosic particulate (c) selected from the group consisting of wood flour, wood fiber and combinations thereof present in an amount of from about 10 to about 90 weight percent; thermoplastic (d) selected from the group consisting of high-density polyethylene, low-density polyethylene, linear low-density polyethylene, polypropylene, copolymers of ethylene and propylene, copolymers of polyethylene and vinyl acetate and combinations thereof present in an amount of from about 90 to about 10 weight percent; and coupling agent (e) which is maleic anhydride grafted high-density polyethylene present in an amount of from about 0.2 to about 10 weight percent.

In a preferred embodiment the present invention is directed to a composition comprising fatty acid bis-amide (a) selected from the group consisting of N,N'-ethylene bis-stearamide, N,N'-ethylene bis-oleamide and combinations thereof present in an amount of from about 1 to about 8 weight percent; inorganic particulate (b) which is finely powdered pumice present in an amount of from about 0.25 to about 1.5 weight percent; cellulosic particulate (c) selected from the group consisting of wood flour, wood fiber and combinations thereof present in an amount of from about 20 to about 80 weight percent; thermoplastic (d) selected from the group consisting of high-density polyethylene, low-density polyethylene, linear low-density polyethylene, polypropylene, copolymers of ethylene and propylene, copolymers of polyethylene and vinyl acetate and combinations thereof present in an amount of from about 80 to about 20 weight percent; and coupling agent (e) which is maleic anhydride grafted high-density polyethylene present in an amount of from about 0.5 to about 5 weight percent.

In more preferred embodiment the present invention is directed to a composition comprising fatty acid bis-amide (a) selected from the group consisting of N,N'-ethylene bis-stearamide, N,N'-ethylene bis-oleamide and combinations thereof present in an amount of from about 2 to about 6 weight percent; inorganic particulate (b) which is finely powdered pumice present in an amount of from about 0.25 to about 1.0 weight percent; cellulosic particulate (c) selected from the group consisting of wood flour, wood fiber and combinations thereof present in an amount of from about 40 to about 70 weight percent; thermoplastic (d) selected from the group consisting of high-density polyethylene, low-density polyethylene, linear low-density polyethylene, polypropylene, copolymers of ethylene and propylene, copolymers of polyethylene and vinyl acetate and combinations thereof present in an amount of from about 50 to about 30 weight percent; and coupling agent (e) which is maleic anhydride grafted high-density polyethylene present in an amount of from about 1.0 to about 3 weight percent.

The most preferred embodiment of the present invention is directed to a composition comprising fatty acid bis-amide (a) which is ethylene bis-stearamide is present in an amount of about 2 to about 6 weight percent; inorganic particulate (b) which is finely powdered pumice is present in an amount of about 0.5 to about 1.0 weight percent; cellulosic particulate (c) which is pine wood flour 40 mesh is present in an amount of about 45 to about 65 weight percent, thermoplastic (d) which is high density polyethylene is present in an amount of about 40 to about 31 weight percent; and coupling agent (e) which is maleic anhydride grafted high-density polyethylene is present in an amount of about 1.5 to about 2.5 weight percent, where said grafted high-density polyethylene contains succinyl anhydride moieties in an amount of about 0.5 to about 2.0 weight percent.

The composition can be used to make an article. The article can be solid or hollow cellulosic-thermoplastic composite profile, board, rod, strand, pellet, siding, sheet, or combination thereof.

The composition can be compounded and blended by any standard means as will be apparent to one skilled in the art. In one method, the combination of fatty acid bis-amide (a), inorganic particulate (b), cellulosic particulate (c), thermoplastic (d) and coupling agent (e) can be extruded through an extruder to provide cellulosic-thermoplastic composite. The composition can be extruded at a temperature sufficient to melt the thermoplastic (d), and then extruded through a die to form cellulosic-thermoplastic composite. The composition can be processed through an extruder at a temperature of from about 145° C. to about 200° C.

There are numerous extrusion processes practiced by those skilled in the art. Practitioners frequently choose to pre-blend fiber and plastic, particularly wood and plastic, and extrude this mixture into pre-blend material, or purchase such pre-blend material from a supplier, and then feed this pre-blend material into the final product process. The composition herein may be used in such a two-pass process wherein cellulosic particulate (c) and thermoplastic (d) are combined in pre-blend material in comparable ratios. Some examples of comparable ratios of cellulosic particulate (c) to thermoplastic (d) can be from about 80:20 to about 10:90, preferably, from about 70:30 to about 20:80 and more preferably from about 60:40 to about 30:70. Compositions containing comparable ratios of cellulosic particulate (c) to thermoplastic (d) can be from about 60:40 to about 40:60 are most preferred.

Pre-blend material of cellulosic particulate (c) and thermoplastic (d) can be in the form of mix, pellet, flake, chip, pastille, granules and combinations thereof. Similarly, fatty acid bis-amide (a) and inorganic particulate (b) can be combined in pre-blend material in comparable ratios. Some examples of comparable ratios of fatty acid bis-amide (a) to inorganic particulate (b) can be from about 40:60 to about 97:3, preferably, from about 67:33 to about 96:4 and more preferably from about 67:33 to about 92:8. Compositions containing comparable ratios of fatty acid bis-amide (a) to inorganic particulate (b) of from about 67:33 to about 92:8 are most preferred. Pre-blend material of fatty acid bis-amide (a) and inorganic particulate (b) can also be in the form of mix, pellet, flake, chip, pastille, granules and combinations thereof. It will be understood by a person skilled in the art that pre-blend material of cellulosic particulate (c) and thermoplastic (d) and/or pre-blend material of fatty acid bis-amide (a) and inorganic particulate (b) may contain any of the other components provided herein. Such additional components may be added to the chosen pre-blend(s) based upon desired processing and/or storage needs of the user.

In a specific embodiment herein fatty acid bis-amide (a), inorganic particulate (b), cellulosic particulate (c), thermoplastic(d) and coupling agent (e) are combined in the substantial absence of metal soaps, such as metal carboxylate; and more specifically, they are combined in the substantial absence of metal stearates such as zinc stearate. Cellulosic-thermoplastic composite is useful as material for use in structural and decorative products for residential and commercial architecture, such as decking, railings, fences, posts, trim, siding, shingles and the like. Cellulosic-thermoplastic composite can also be used for the production of articles in automotive applications such as knobs, handles, interior fascia, sound-deadening panels and carpet backings. Articles prepared from cellulosic-thermoplastic composite containing the above described composition have improved performance, such as improved flex strength and improved resistance to water absorption when compared to commonly used natural fiber-plastic composites.

As will be seen in the examples, when EBS and pumice are used in conjunction with coupling agent (e) in cellulosic-thermoplastic composite, a 38% improvement in flex strength over a zinc stearate/EBS system is observed. Furthermore a 28% reduction in 24-hour water absorption is also observed.

EXAMPLES

Test formulations were prepared using American Wood Fibers 4020 pine wood flour (40 mesh). The wood was dried in a circulating oven at 121° C. for 24 hours. Resulting moisture content was less than 1%. Thermoplastic (d) resin was BP Solvay B54-60 frac-melt high-density polyethylene (0.5 g/10 min Melt Flow), used as received. Chemtura Polybond® 3029 maleic anhydride grafted HDPE coupling agent (1.3% succinyl anhydride, Melt Flow Rating=4 g/10 min, 190 C, 2.16 kg), Naugard® B-25 antioxidant, Lubrazinc® W (zinc stearate) lubricant, and Kemamide® EBS (ethylene bis-stearamide) were all used as received. VitroCo Vitrolite®XP powdered pumice was used as received. Luzenac America Silverline® 403 talc was used as received.

All samples were extruded using a Brabender® Intelli-Torque Plasti-Corder® with a co-rotating #403 conical twin-screw configuration, and a Brabender 7150 drive unit. Zone temperatures were set at: Zone 1 (150° C.), Zone 2 (160° C.), Zone 3 (160° C.), Zone 4 (die) (150° C.). The die produces a continuous flat test specimen 1.0" wide and 0.080" thick. Data was acquired using Brabender Measuring Extruder Basic Program with Multiple Evaluation, Version 3.2.1. Compounded formulations were fed into the extruder from a K-Tron K2VT20 volumetric feeder. Specimens were extruded at 60 rpm, and in some cases at 80, and 100 rpm as well.

Maleic anhydride content of the coupling agent was determined by dissolving it in boiling toluene and titrating to a Bromothymol Blue end point using a standard 0.3N methanolic KOH solution. The KOH titrant was standardized using benzoic acid. The number of milliequivalents of KOH titrant needed to neutralize one hundred grams of coupling agent was determined. The percent maleic anhydride in the coupling agent was then calculated assuming one mole of KOH neutralized one mole of maleic anhydride. This assumption was confirmed by titration of straight maleic anhydride under the same conditions that the coupling agents were tested under. The number of millimoles of functionality per 100 grams of coupling agent was calculated by dividing the percent maleic anhydride by the molecular weight of the chemical, which was 98 grams per mole (g/mol) and multiplying by 1000.

The Melt Flow Index of the coupling agent was determined using a Tinius Olsen Extrusion Plastometer Model MP600 following the procedures outlined in ASTM D1238.

A modified ASTM D790 test procedure was used to generate the flexural strength and flexural modulus data. In this modified procedure a cross-head speed of 0.5 inches per minute (in/min) was used instead of the standard 0.05 inches per minute.

Water absorption was determined by immersing a 1.0-inch by 2.0-inch strip of extrudate in tap water for 24 hours at room temperature and measuring the weight gain.

Figure 2:
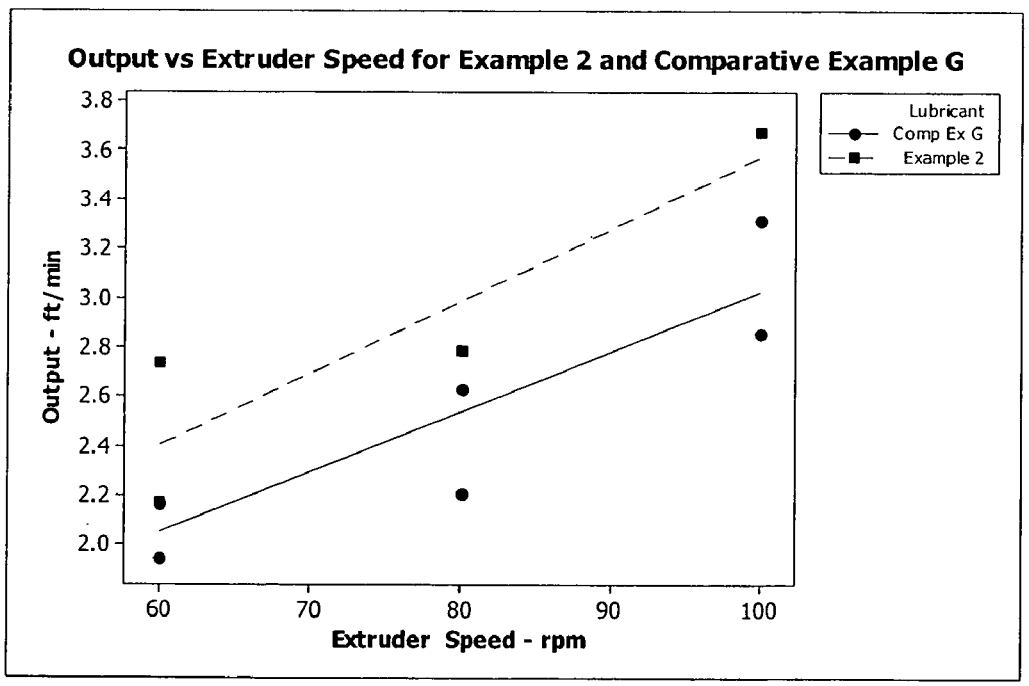
FIG. 2 is a graph of the output vs extruder speed for example 2 and comparative example G.

Test formulations are presented in Table 1. Test data from specimens extruded at 60 rotations per minute (rpm) are presented in Table 2. FIGS. 1 and 2 were plotted using MINITAB® V.14.13 (Minitab Inc.).

TABLE 2

| Example | Output ft/min | Flex Strength MPa(mega Pascals) | % Water Abs 24 h |
|---|---|---|---|
| 1 | 1.88 | 33.1 | 6.9 |
| 2 | 2.73 | 31.2 | 3.9 |
| A | 1.71 | 30.6 | 5.7 |
| B | 2.13 | 23.3 | 9.0 |
| C | 2.01 | 20.8 | 9.7 |
| D | 1.86 | 23.9 | 9.6 |
| E | 2.30 | 27.7 | 6.9 |
| F | 2.28 | 25.4 | 6.5 |
| G | 2.16 | 31.6 | 5.8 |
| H | 2.11 | 28.4 | 10.6 |
| I | 1.99 | 34.9 | 6.9 |
| J | 1.67 | 28.2 | 6.7 |

The performance advantage that is obtained by employing a maleic anhydride grafted coupling agent in the absence of zinc stearate is striking. The average flex strength for the eight formulations with Polybond® 3029 coupling agent but without zinc stearate (1, 2, A, E, F, G, I, J) is 30.3 MPa, while the three formulations containing zinc stearate (B, C, D) average only 22.7 MPa. Similarly, the water absorption in 24 hours for the eight formulations with coupling agent but without zinc stearate is 6.2%, as compared to 9.4% for the three formulations containing zinc stearate. Comparing B, C, and D shows that the advantage of using coupling agent has been lost to interference from the zinc stearate.

The additional advantage of using coupling agent in combination with fatty ethylene bis-amide lubricant as compared to an ester or non-metallic stearate lubricant is seen in the flex strength comparison between the average of the coupling agent/ethylene bis-amide formulations 1, 2, A, G, I, J (31.6 MPa) and the average of the coupling agent with the other lubricants E and F (26.6 MPa).

TABLE 1

| Example | PB3029 % | ZnSt % | EBS % | Pumice % | Talc % | WP2200 % | TPW-113 % | SXT-3100 % | Wood % | HDPE % | B-25 AO % |
|---|---|---|---|---|---|---|---|---|---|---|---|
| 1 | 2.0 | | 4.0 | 0.75 | | | | | 60 | 33.15 | 0.1 |
| 2 | 2.0 | | | 0.75 | | 4.0 | | | 60 | 33.15 | 0.1 |
| A | 2.0 | | 4.0 | | | | | | 60 | 33.15 | 0.1 |
| B | 2.0 | 2.0 | 2.0 | | | | | | 60 | 33.90 | 0.1 |
| C | 2.0 | 2.0 | 2.0 | 0.75 | | | | | 60 | 35.15 | 0.1 |
| D | | 2.0 | 2.0 | | | | | | 60 | 35.90 | 0.1 |
| E | 2.0 | | | 0.75 | | | 4.0 | | 60 | 33.15 | 0.1 |
| F | 2.0 | | | 0.75 | | | | 4.0 | 60 | 33.15 | 0.1 |
| G | 2.0 | | | | | 4.0 | | | 60 | 33.90 | 0.1 |
| H | | | 4.0 | 0.75 | | | | | 60 | 35.15 | 0.1 |
| I | 2.0 | | | | 0.75 | 4.0 | | | 60 | 33.15 | 0.1 |
| J | 2.0 | | 4.0 | | 3.0 | | | | 60 | 30.90 | 0.1 |

PB3029 is maleated high-density polyethylene produced by Chemtura.
WP2200 is ethylene bis-lauramide produced by Lonza.
TPW is a proprietary metallic stearate free material produced by Ferro.
SXT is a non-metallic stearate produced by Struktol.
B-25 is Naugard ® B-25 antioxidant.
All percentages are reported in terms of weight percent.

The advantage of adding pumice to the formulation is shown in FIGS. 1 and 2. In each case a 15 to 20% increase in product output rate is obtained with the additional lubricant.

The advantage of pumice over another inorganic particulate (b), talc, is shown in Comparative Examples I and J. Comparative Example I, at 0.75% talc had good physical properties, but it did not extrude properly, and exhibited severe edge tear. Comparative Example J at 3.0% talc had the slowest extrusion rate of all samples, and moderately reduced flex strength of 28.2 MPa.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A composition comprising:
   (a) from about 1 to about 8 weight percent of a fatty acid bis-amide of the structure:

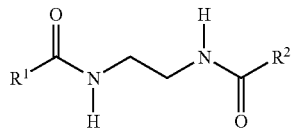

where $R^1$ and $R^2$ are independently saturated or unsaturated linear hydrocarbyl groups containing from 11 to 35 carbon atoms,
   (b) from about 0.25 to 0.75 weight percent of an inorganic particulate,
   (c) from about 10 to about 90 weight percent of a cellulosic particulate from about 1 mm to about 100 μm in length,
   (d) from about 90 to about 10 weight percent of a thermoplastic; and,
   (e) from about 0.2 to about 10 weight percent of a coupling agent for coupling cellulosic particulate (c) to thermoplastic (d),
   wherein the composition contains no lubricants comprising zinc stearate and said inorganic particulate is finely powdered pumice having a particle size of 50 μm or less.

2. The composition of claim 1 wherein $R^1$ and $R^2$ are independently saturated or unsaturated linear hydrocarbyl groups containing from 15 to 22 carbon atoms.

3. The composition of claim 1 wherein fatty acid bis-amide (a) is selected from the group consisting of N,N'-ethylene bis-stearamide, N,N'-ethylene bis-oleamide, N,N'-ethylene bis-dodecanamide, N,N'-ethylene bis-tetradecanamide, N,N'-ethylene bis-hexadecanamide, N,N'-ethylene bis-tetradecanamide, N,N'-ethylene bis-tallowamide, N,N'-ethylene bis-eicosanamide, N,N'-ethylene bis-docosanamide, N,N'-ethylene bis-tetracosanamide, N,N'-ethylene bis-4-dodecenamide, N,N'-ethylene bis-9-dodecenamide, N,N'-ethylene bis-4-tetradecenamide, N,N'-ethylene bis-5-tetradecenamide, N,N'-ethylene bis-cis-6-octadeceneamide, N,N'-ethylene bis-trans-6-octadeceneamide, N,N'-ethylene bis-cis-9-octadeceneamide, N,N'-ethylene bis-trans-9-octadeceneamide, N,N'-ethylene bis-trans-11-octadeceneamide, N,N'-ethylene bis-cis-9-eicosenamide, N,N'-ethylene bis-cis-11-eicosenamide, N,N'-ethylene bis-trans-11-eicosenamide, N,N'-ethylene bis-cis-11-docosenamide, N,N'-ethylene bis-cis-13-docosenamide, N,N'-ethylene bis-trans-13-docosenamide, N,N'-ethylene bis-cis-15-tetracosenamide and combinations thereof.

4. The composition of claim 1 wherein fatty acid bis-amide (a) is a cross reaction product of N,N'-ethylenediamine with two or more fatty acids.

5. The composition of claim 4 wherein fatty acid bis-amide (a) is N-oleyl-N'-stearyl-ethylene-bis-amide.

6. The composition of claim 1 wherein cellulosic particulate (c) is selected from the group consisting of wood fiber, wood particles, wood chips, ground wood, wood flour, wood flakes, wood veneers, wood laminates, saw dust, paper, newspaper, cardboard, wood pulp fiber, chemical pulp, recycled paper fiber, recycled boxes, recycled box fiber, recycled newspaper, recycled newspaper fiber, recycled computer printout, recycled computer printout fiber, milling tailings, hardwood fiber, softwood fiber, newsprint, ground newsprint, magazines, ground magazines, books, ground books, ground cardboard, wheat chaff, bamboo fiber, pond sludge, cork and combinations thereof.

7. The composition of claim 1 wherein thermoplastic (d) is selected from the group consisting of high-density polyethylene, low-density polyethylene, linear low-density polyethylene, polypropylene, copolymers of ethylene and propylene, co-polyethylene-vinyl acetate and combinations thereof.

8. The composition of claim 1 wherein coupling agent (e) is selected from the group consisting of maleic anhydride grafted polyolefin, acrylic acid grafted polyolefin, vinyl acetate grafted polyolefin and combinations thereof.

9. The composition of claim 1 wherein coupling agent (e) is selected from the group consisting of maleic anhydride grafted high-density polyethylene, maleic anhydride grafted low-density polyethylene, maleic anhydride grafted polypropylene, acrylic acid grafted high-density polyethylene, acrylic acid grafted low-density polyethylene, acrylic acid grafted polypropylene, co-polyethylene-vinyl acetate and combinations thereof.

10. The composition of claim 1 containing at least one additional component which is selected from the group consisting of antioxidant, foaming agent, dye, pigment, cross-linking agent, inhibitor and accelerator.

11. The composition of claim 1 wherein fatty acid bis-amide (a) is present in an amount of from about 1 to about 8 weight percent, inorganic particulate (b) is present in an amount of 0.75 weight percent, cellulosic particulate (c) is present in an amount of from about 20 to about 80 weight percent, thermoplastic (d) is present in an amount of from about 80 to about 20 weight percent, coupling agent (e) is selected from the group consisting of maleic anhydride grafted polyolefin present in an amount of from about 0.5 to about 5 weight percent and acrylic acid grafted polyolefin present in an amount of from about 1 to about 7 weight percent and combinations thereof.

12. The composition of claim 1 wherein fatty acid bis-amide (a) is present in an amount of from about 2 to about 6 weight percent, inorganic particulate (b) is present in an amount of 0.75 weight percent, cellulosic particulate (c) is present in an amount of from about 40 to about 70 weight percent, thermoplastic (d) is present in an amount of from about 50 to about 30 weight percent, and coupling agent (e) which is maleic anhydride grafted high-density polyethylene present in an amount of from about 1.0 to about 3 weight percent.

13. The composition of claim 1 wherein fatty acid bis-amide (a) is selected from the group consisting of N,N'-ethylene bis-stearamide, N,N'-ethylene bis-oleamide and combinations thereof and is present in an amount of from about 1 to about 8 weight percent; inorganic particulate (b) is present in an amount of 0.75 weight percent; cellulosic particulate (c) is selected from the group consisting of wood flour, wood fiber and combinations thereof present in an amount of from about 10 to about 90 weight percent, thermoplastic (d) is selected from the group consisting of high-density polyethylene, low-density polyethylene, linear low-density polyethylene, polypropylene, copolymers of ethylene and propylene, copolymers of polyethylene and vinyl acetate, and combinations thereof present in an amount of from about 90 to about 10 weight percent; and coupling agent (e) which is maleic anhydride grafted high-density polyethylene present in an amount of from about 0.2 to about 10 weight percent.

14. The composition of claim 1 wherein fatty acid bis-amide (a) is selected from the group consisting of N,N'-ethylene bis-stearamide, N,N'-ethylene bis-oleamide and combinations thereof present in an amount of from about 1 to about 8 weight percent; inorganic particulate (b) is present in an amount of 0.75 weight percent; cellulosic particulate (c) is selected from the group consisting of wood flour, wood fiber and combinations thereof present in an amount of from about 20 to about 80 weight percent; thermoplastic (d) is selected from the group consisting of high-density polyethylene, low-density polyethylene, linear low-density polyethylene, polypropylene, copolymers of ethylene and propylene, copolymers of polyethylene and vinyl acetate, and combinations thereof present in an amount of from about 80 to about 20 weight percent; and coupling agent (e) is maleic anhydride grafted high-density polyethylene present in an amount of from about 0.5 to about 5 weight percent.

15. The composition of claim 1 wherein fatty acid bis-amide (a) is selected from the group consisting of N,N'-ethylene bis-stearamide, N,N'-ethylene bis-oleamide and combinations thereof and is present in an amount of from about 2 to about 6 weight percent; inorganic particulate (b) is present in an amount of 0.75 weight percent; cellulosic particulate (c) is selected from the group consisting of wood flour, wood fiber and combinations thereof present in an amount of from about 40 to about 70 weight percent; thermoplastic (d) is selected from the group consisting of high-density polyethylene, low-density polyethylene, linear low-density polyethylene, polypropylene, copolymers of ethylene and propylene, copolymers of polyethylene and vinyl acetate, and combinations thereof present in an amount of from about 50 to about 30 weight percent; and coupling agent (e) which is maleic anhydride grafted high-density polyethylene present in an amount of from about 1.0 to about 3 weight percent.

16. The composition of claim 1 wherein fatty acid bis-amide (a) is ethylene bis-stearamide present in an amount of about 2 to about 6 weight percent; inorganic particulate (b) is present in an amount of 0.75 weight percent; cellulosic particulate (c) which is pine wood flour 40 mesh is present in an amount of about 45 to about 65 weight percent, thermoplastic (d) which is high density polyethylene is present in an amount of about 40 to about 31 weight percent; and coupling agent (e) which is maleic anhydride grafted high-density polyethylene, containing about 0.5 to about 2.0 weight percent succinyl anhydride moieties, is present in an amount of about 1.5 to about 2.5 weight percent.

17. An article fabricated from the composition of claim 1 wherein said article is selected from the group consisting of solid or hollow cellulosic-thermoplastic composite profile, board, rod, strand, pellet, siding, sheet and combinations thereof.

* * * * *